United States Patent [19]
Bichler et al.

[11] Patent Number: 5,386,187
[45] Date of Patent: Jan. 31, 1995

[54] METHOD FOR ANTICIPATORY CONTROL OF A SWITCHED-MODE POWER SUPPLY FOR COMPENSATING FOR FLUCTUATIONS IN FEED VOLTAGE AND CIRCUIT CONFIGURATION FOR PERFORMING THE METHOD

[75] Inventors: Helmut Bichler, Graefelfing; Michael Herfurth, Gilching, both of Germany

[73] Assignee: Siemens Aktiengesellschaft, Munich, Germany

[21] Appl. No.: 129,977

[22] Filed: Sep. 30, 1993

[30] Foreign Application Priority Data

Sep. 30, 1992 [DE] Germany ............... 4232835

[51] Int. Cl.$^6$ ............................................. G0F5 1/10
[52] U.S. Cl. ................................... 323/222; 323/282
[58] Field of Search ............... 323/222, 282, 285, 299, 323/351; 363/16, 21, 95, 97, 124

[56] References Cited

U.S. PATENT DOCUMENTS

| | | | |
|---|---|---|---|
| 4,234,842 | 11/1980 | Brennen et al. | 323/119 |
| 4,825,351 | 4/1989 | Uesugi | 323/222 |
| 5,003,454 | 3/1991 | Bruning | 323/222 |
| 5,181,159 | 1/1993 | Peterson et al. | 323/222 |
| 5,282,126 | 1/1994 | Husgen | 323/222 |
| 5,293,077 | 3/1994 | Seki et al. | 323/282 |
| 5,309,082 | 3/1994 | Payne | 323/282 |

OTHER PUBLICATIONS

Siemens Components May 1988 (Böck), TDA 4918/4919 "New Generation of Control ICS For Switched–Mode Power Supplies."
Siemens AG TDA 4700, pp. 182–231 "Integrated Control Circuits For Single Phase and Push–Pull Switch . . . ".
Siemens AG TDA 4818/4819 pp. 242–261 "Integrated Control Circuits".

*Primary Examiner*—Steven L. Stephan
*Assistant Examiner*—Matthew Nguyen
*Attorney, Agent, or Firm*—Herbert L. Lerner; Laurence A. Greenberg

[57] ABSTRACT

A switched-mode power supply for compensating for fluctuations in a feed voltage includes at least one electronic switch and a control circuit with a frequency generator, a comparator circuit, and a trigger circuit. The trigger circuit furnishes a trigger signal for the electronic switch as a function of an output signal of the comparator circuit and an output signal of the frequency generator. The comparator circuit has a switching threshold being defined as a function of a load current of the switched-mode power supply. The comparator circuit has a signal input being triggered with a periodically rising and falling control signal having a frequency defined by the frequency generator. The control signal has a signal shape being varied as a function of an instantaneous value of a feed voltage of the switched-mode power supply. In a method for anticipatory control of the power supply for compensating for feed voltage fluctuations, the control signal has a direct component and an alternating component, and only the direct component of the control signal is varied as a function of fluctuations of the feed voltage of the power supply.

4 Claims, 3 Drawing Sheets

METHOD FOR ANTICIPATORY CONTROL OF A SWITCHED-MODE POWER SUPPLY FOR COMPENSATING FOR FLUCTUATIONS IN FEED VOLTAGE AND CIRCUIT CONFIGURATION FOR PERFORMING THE METHOD

BACKGROUND OF THE INVENTION

Field of the Invention

The invention relates to a method for anticipatory or pilot control of a switched-mode power supply for compensating for fluctuations in a feed voltage, wherein the switched-mode power supply includes at least one electronic switch and a control circuit with a frequency generator, a comparator circuit, and a trigger circuit or multivibrator; the trigger circuit or multivibrator furnishing a trigger signal for the at least one electronic switch as a function of an output signal of the comparator circuit and an output signal of the frequency generator; the comparator circuit having a switching threshold being defined as a function of a load current of the switched-mode power supply; the comparator circuit having a signal input being triggered with a periodically rising and falling control signal having a frequency defined by the frequency generator; and the control signal having a signal shape being varied as a function of an instantaneous value of a feed voltage of the switched-mode power supply.

The invention also relates to a control circuit configuration for a switched-mode power supply having at least one electronic switch, for compensating for fluctuations in a feed voltage, including a frequency generator, a comparator circuit, a trigger circuit or multivibrator, and a circuit element furnishing a periodically rising and falling control signal with a frequency defined by the frequency generator; the trigger circuit or multivibrator furnishing a trigger signal for the at least one electronic switch as a function of an output signal of the comparator circuit and an output signal of the frequency generator; the comparator circuit having a switch threshold being defined as a function of a load current of the switched-mode power supply; the comparator circuit having a signal input being triggered with the periodic control signal; and the control signal having a signal shape being varied as a function of an instantaneous value of the feed voltage of the switched-mode power supply.

Both single-phase and push-pull switched-mode power supplies are known, especially with integrated control circuits in which anticipatory control is provided to compensate for fluctuations in the feed voltage. Commercially available integrated control circuits TDA4700, TDA4718, TDA4716, TDA4714, TDA4918 and TDA4919, and their use in switched-mode power supplies, are described, among other sources, in the Siemens 1989/90 data manual "ICS für Industrielle Anwendungen" [ICs for Industrial Applications], pp. 182–231 and 242–260. Such switched-mode power supplies are also shown in the reprint of Siemens Components 5/88, pp. 191–194; 6/88, pp. 260–265; and 1/89, pp. 12–17, by R. Blöckl, which appeared under the title "TDA 4918/4919 — New Generation of Control ICs for Switched-Mode Power Supplies" especially in FIG. 3 of Part 2. In all of those control circuits, a pulse width modulated signal is furnished in order to trigger the electronic switches of switched-mode power supplies constructed from them. The pulse width is defined both by an output voltage regulator circuit and by an anticipatory control that takes the feed voltage into account. The integrated circuits described therein include, among other elements, a frequency generator, a ramp generator, a comparator that compares the output signal of the ramp generator with a voltage level defined as a function of the instantaneous value of the output voltage of the switched-mode power supply (and therefore of the load current), and a flip-flop that is triggered by the frequency generator and the aforementioned comparator and thus for normal operation defines the pulse width of the trigger pulses for the electronic switch or switches of a switched-mode power supply constructed with the trigger circuit. The slope of the leading edge of the output signal of the ramp generator can be varied by varying a control current.

In the known switched-mode power supplies, a method for anticipatory control is used that serves to compensate for feed voltage fluctuations. A variation in the feed voltage causes a variation in the slope of the leading edge of the ramp generator. If the feed voltage is high, the slope of the leading edge of the ramp generator output signal is greater, so that the threshold value of the comparator, which is affected by the output voltage controller, wherein the comparator is connected downstream of the ramp generator, is reached sooner than if the feed voltage is lower and consequently if the ramp course is flatter. Within certain limits, a variation in the feed voltage accordingly does not need to be stabilized by the regulator. The regulator is provided to keep the output voltage constant and the stabilization would be performed by adapting the threshold value of the comparator.

The known anticipatory control method, in which the ramp slope is controlled, is useful for feed voltages that do not deviate greatly from a nominal value, with an example being rectified sinusoidal voltages that are partially smoothed by a capacitor. Since the slope of the leading edge of a ramp generator output signal cannot be varied arbitrarily, and in particular cannot become arbitrarily great, as would be necessary in the event of major deviations of the feed voltages of a mean value, known switched-mode power supplies accordingly require either preparation of the feed voltage, for instance with the aid of a capacitor, or stabilization of fluctuations in the feed voltage by means of the regulator that keeps the output voltage constant.

Particularly for anticipatory control of an input voltage in the form of an unsmoothed rectified sinusoidal voltage, a correct specification in the region of the zero crossover and in the region of the amplitude is also important. Good anticipatory control over the entire operating range by means of a controlled ramp slope cannot be attained in that case. As will be explained below in conjunction with FIG. 4, there are limits to a method for anticipatory control of a switched-mode power supply with the aid of a variable ramp slope. An anticipatory control by means of controlled ramp slope functions properly only with input voltages that are in the vicinity of the rated value for which the anticipatory control was dimensioned.

SUMMARY OF THE INVENTION

It is accordingly an object of the invention to provide a method for anticipatory control of a switched-mode power supply for compensating for fluctuations in a feed voltage and a circuit configuration for performing the method, which overcome the hereinafore-mentioned disadvantages of the heretofore-known methods and devices of this general type and with which even major fluctuations in the feed voltage can be compensated for.

With the foregoing and other objects in view there is provided, in accordance with the invention, in a method for anticipatory or pilot control of a switched-mode power supply for compensating for fluctuations in a feed voltage, wherein the switched-mode power supply includes at least one electronic switch; and a control circuit with a frequency generator, a comparator circuit, and a trigger circuit or multivibrator; the trigger circuit or multivibrator furnishing a trigger signal for the at least one electronic switch as a function of an output signal of the comparator circuit and an output signal of the frequency generator; the comparator circuit having a switching threshold being defined as a function of a load current of the switched-mode power supply; the comparator circuit having a signal input being triggered with a periodically rising and falling control signal having a frequency defined by the frequency generator; and the control signal having a signal shape being varied as a function of an instantaneous value of a feed voltage of the switched-mode power supply, the improvement which comprises varying only a direct component of the periodically rising and falling control signal having a direct component and an alternating component, as a function of fluctuations of the feed voltage of the switched-mode power supply.

In accordance with another mode of the invention, there is provided a method which comprises imparting a sawtooth shape on the alternating component of the periodically rising and falling control signal.

With the objects of the invention in view, there is also provided, in a switched-mode power supply having at least one electronic switch, a control circuit for compensating for fluctuations in a feed voltage, comprising a frequency generator supplying an output signal, a comparator circuit supplying an output signal, a trigger circuit or multivibrator connected to the frequency generator, to the comparator circuit and to the at least one electronic switch, and a circuit element furnishing a periodically rising and falling control signal with a frequency defined by the frequency generator; the trigger circuit or multivibrator furnishing a trigger signal for the at least one electronic switch as a function of the output signal of the comparator circuit and the output signal of the frequency generator; the comparator circuit having a switch threshold being defined as a function of a load current of the switched-mode power supply; the comparator circuit having a signal input being triggered with the periodic control signal; and the control signal having a signal shape being varied as a function of an instantaneous value of the feed voltage of the switched-mode power supply, the control signal including a direct component and an alternating component, and the circuit element furnishing the control signal having a circuit configuration for varying the direct component of the control signal as a function of fluctuations in the feed voltage of the switched-mode power supply.

In accordance with a concomitant feature of the invention, the frequency generator furnishes both a rectangular signal and a ramp-shaped signal having the same period duration.

A method according to the invention for pilot or anticipatory control of a switched-mode power supply for compensating for fluctuations in the feed voltage differs from a prior art method described above primarily in that a ramp voltage with a direct voltage component and with a fixed ramp slope is compared with a voltage level defined as a function of the instantaneous value of the output voltage of the switched-mode power supply, and that the anticipatory control is performed by means of a variation of a direct component of the ramp.

Through the use of this method of the invention, error-free anticipatory control can be achieved. In other words, the anticipatory control fully compensates for fluctuations in the input voltage, and the voltage regulator needs to compensate only for load-dictated fluctuations.

Other features which are considered as characteristic for the invention are set forth in the appended claims.

Although the invention is illustrated and described herein as embodied in a method for anticipatory control of a switched-mode power supply for compensating for fluctuations in a feed voltage and a circuit configuration for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4b is a diagram illustrating a course of voltages at a comparator input of a circuit configuration of the prior art with anticipatory control by means of a variable ramp slope, specifically an output voltage $U_{Regler}$ defined for a fixed load value, along with three ramp voltages $U_{Rampe1}$, $U_{Rampe2}$ and $U_{Rampe3}$, which are associated with the instantaneous values of the input voltage UI of FIG. 4a.

DESCRIPTION OF THE PREFERRED EMBODIMENTS

Figure 1:
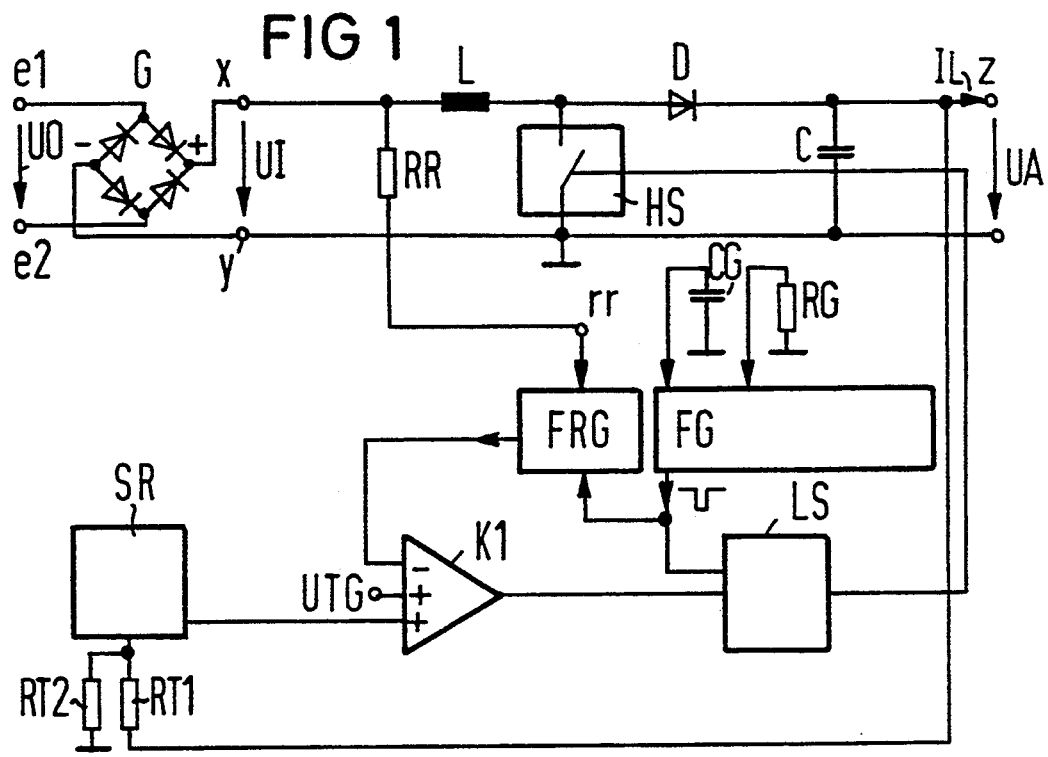
FIG. 1 is a schematic and block circuit diagram of an exemplary embodiment of a high set actuator as one possible embodiment of a circuit configuration according to the invention for performing a method as defined by the method claims.

Referring now to the figures of the drawing in detail and first, particularly, to FIG. 1 thereof, there is seen one possible embodiment of a circuit configuration according to the invention for performing a method as defined by the method claims, combined with a typical upward regulator (high set actuator). Naturally, a circuit configuration according to the invention may also be used to control other basic switched-mode power supply circuits, such as a downward regulator (low set actuator), an inverter, an upward-downward regulator (high-low set actuator), a blocking oscillator or a flow converter connected in single-phase or push-pull fashion.

The principles of the basic switched-mode power supply circuit, and their particular features, advantages and disadvantages, have been described, among other sources, in the Siemens textbook entitled "Schaltnetzteile" [Switched-Mode Power Supplies] by Walter Hirschmann and Alfred Hauenstein, 1990, pp. 15-68.

In FIG. 1, a rectifier configuration G is shown, with two input terminals e1 and e2 and two output terminals x and y. The input terminals e1 and e2 are acted upon by an alternating voltage UO. The output terminals x and y of the rectifier circuit G accordingly furnish a non-smoothed, alternating direct voltage UI. The terminals x and y are provided at the same time as input terminals for a basic high set actuator circuit. This high set actuator has two output terminals z and y, at which an output direct voltage UA is furnished. The basic circuit of the high set actuator shown in FIG. 1 includes a series circuit of a choke L and a diode D, which are disposed between the input terminal x and the output terminal z. The diode D is connected in the forward direction between a connection terminal of the choke L and the output terminal z. A capacitor C is provided between the output terminal z and the output terminal y. A circuit node that connects the inductive choke L with the diode D can be connected to the terminal y through a semiconductor switch HS. The terminal y in this case represents the reference potential, ground. The control circuit of this high set actuator includes, among other elements, a frequency generator FG, having a frequency which is defined by a capacitor CG connected to reference potential and by a resistor RG connected to reference potential. An output of the frequency generator FG is connected to a clock input of a frequency ramp generator FRG, and to one input of a logic circuit LS. The frequency ramp generator FRG has an input terminal rr, which is acted upon by an electrical variable that is dependent on the instantaneous value of the input voltage UI at the terminals x and y of the switched-mode power supply. The frequency ramp generator FRG furnishes a ramp-shaped output signal, having a frequency which depends on the output frequency of the frequency generator FG, and on which a direct voltage component is superimposed. The direct voltage component of the output signal of the frequency ramp generator FRG is varied as a function of an electrical variable furnished at the terminal rr. The electrical variable furnished at the terminal rr is dependent on the instantaneous value of the input voltage UI at the terminals x and y of the switched-mode power supply. In the exemplary embodiment of FIG. 1, a current is impressed at the input terminal rr by the provision of a resistor RR between the terminal x and the input terminal rr.

The output terminal z of the high set actuator is connected to reference potential, ground, through a voltage divider formed of a first divider resistor RT1 and a second divider resistor RT2. A connecting node between the two resistors RT1 and RT2, which furnishes a voltage proportional to the output voltage UA, is connected to one input of a voltage regulator SR. The voltage regulator SR supplies a regulator output signal as a function of the output voltage UA between the output terminals z and y of the high set actuator shown. To that end, the output of the voltage regulator SR is connected to one input, in this case a non-inverting input, of a comparator circuit K1. The output of the aforementioned frequency ramp generator FRG is connected to another input, in this case an inverting input, of the comparator K1. The output of the comparator circuit K1 is connected to one input of the aforementioned logic circuit LS. The logic circuit LS furnishes a control signal at its output for triggering the semiconductor switch HS. This control signal depends on the output variable of the comparator circuit K1 and on the output signal of the frequency generator FG. The output signal of the logic circuit LS in this case is a pulse width modulated signal, having a repetition frequency which is defined by the output frequency of the frequency generator FG and having a pulse width which is defined by the output variable of the comparator circuit K1. The output signal of the comparator K1 is put into one logical state by the trailing edge of the output signal of the frequency ramp generator, and this logical state changes as soon as the instantaneous value of the leading edge of the output signal of the frequency ramp generator FRG attains the reference voltage furnished by the voltage regulator SR. In order to avoid overly great pulse widths at the output of the logic circuit LS and therefore long turn-on times of the semiconductor switch HS resulting from brief load-dictated control oscillations of the voltage regulator SR, it is possible, as shown in FIG. 1, for the comparator K1 to be equipped with a further non-inverting input that is kept at a fixed basic voltage UTG.

The duty factor of the frequency generator FG defines the limit values for the ratio between the turn-on duration of the semiconductor switch HS and the period duration of the control circuit.

If the instantaneous value of the input voltage UI at the terminals x and y of the high set actuator is relatively high, then a relatively high current flows through the resistor RR into the input terminal rr of the frequency generator FRG. Accordingly, a higher direct voltage is superimposed on the output ramp signal of the frequency generator FRG, so that given an equal ramp slope of this signal, the signal applied to the inverting input of the comparator K1 instead reaches the level of the signal applied to the non-inverting input of this comparator K1. In the case of lesser instantaneous values of the input voltage UI at the terminals x and y, the switchover time of the comparator K1 is reached correspondingly later within this period.

Figure 2:
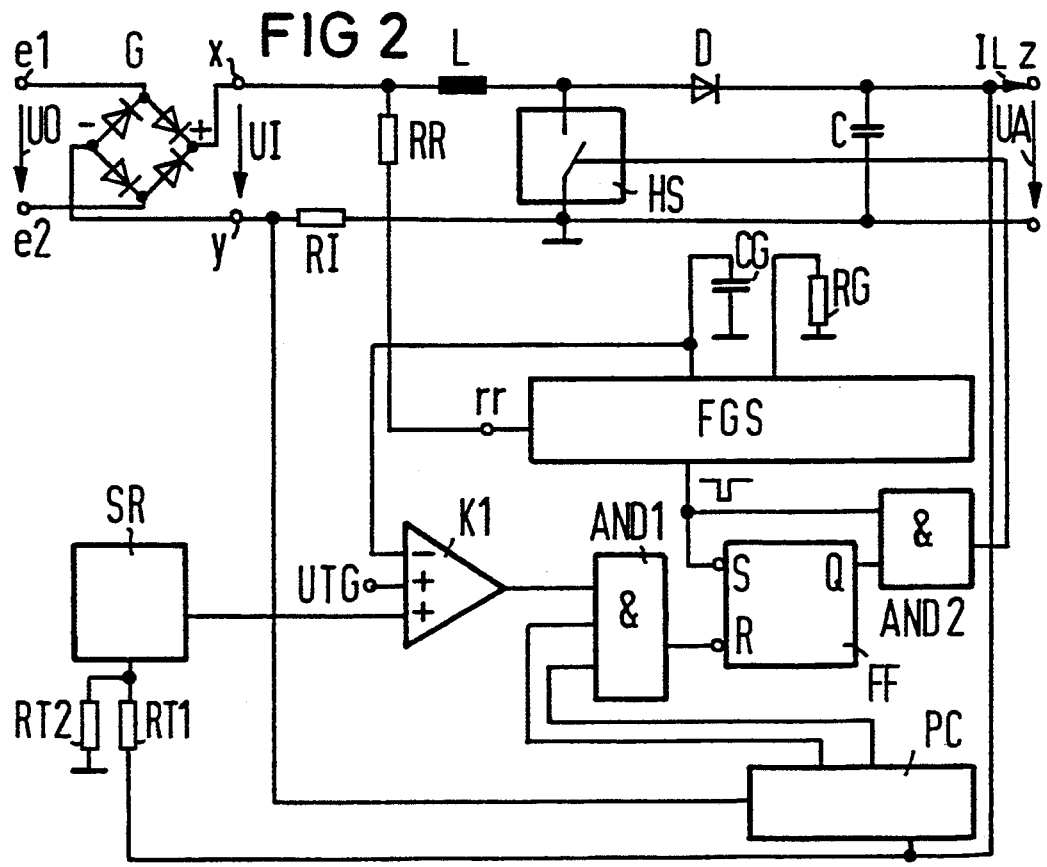
FIG. 2 is a schematic and block circuit diagram of an especially advantageous alternative to the circuit configuration of FIG. 1.

FIG. 2 shows the basic high set actuator circuit of FIG. 1 with a special frequency generator circuit FGS, a special embodiment of the logic circuit LS, and an additional protective circuit PC, which prevents an overload of the switched-mode power supply if the output voltage UA or the current through the choke L is too high. The logic circuit LS includes an AND gate AND1 having an input connected to the output of the comparator circuit K1, a flip-flop FF having a resetting input R connected to an output of the AND gate AND1, and an AND gate AND2 having an input connected to an output Q of the flip-flop FF. The output of the special frequency generator circuit FGS is connected to a setting input S of the flip-flop FF and to another input of the AND gate AND2. An output of the AND gate AND2 is connected to the semiconductor switch HS. Finally, two outputs of the additional protective circuit PC are connected to two other inputs of the AND gate AND1. The additional protective circuit PC is also connected to the resistor RT1 and to a resistor RI connected to the terminal y.

Elements LS or AND1, AND2 and FF form a trigger circuit or multivibrator. A circuit element formed of the components FGS or FRG furnishes a periodically rising and falling control signal with a frequency defined by the frequency generator FG, FGS.

An embodiment of a frequency generator FGS of the kind provided in FIG. 2 is shown in detail in FIG. 3 and will be described as part of the description of FIG. 3. The frequency generator FGS is a frequency generator that furnishes both a rectangular signal and a ramp signal. A direct voltage having a value which depends on an electrical variable fed to an input terminal rr of the frequency generator FGS is superimposed on the ramp-shaped output signal of this frequency generator FGS in this case.

Figure 3:
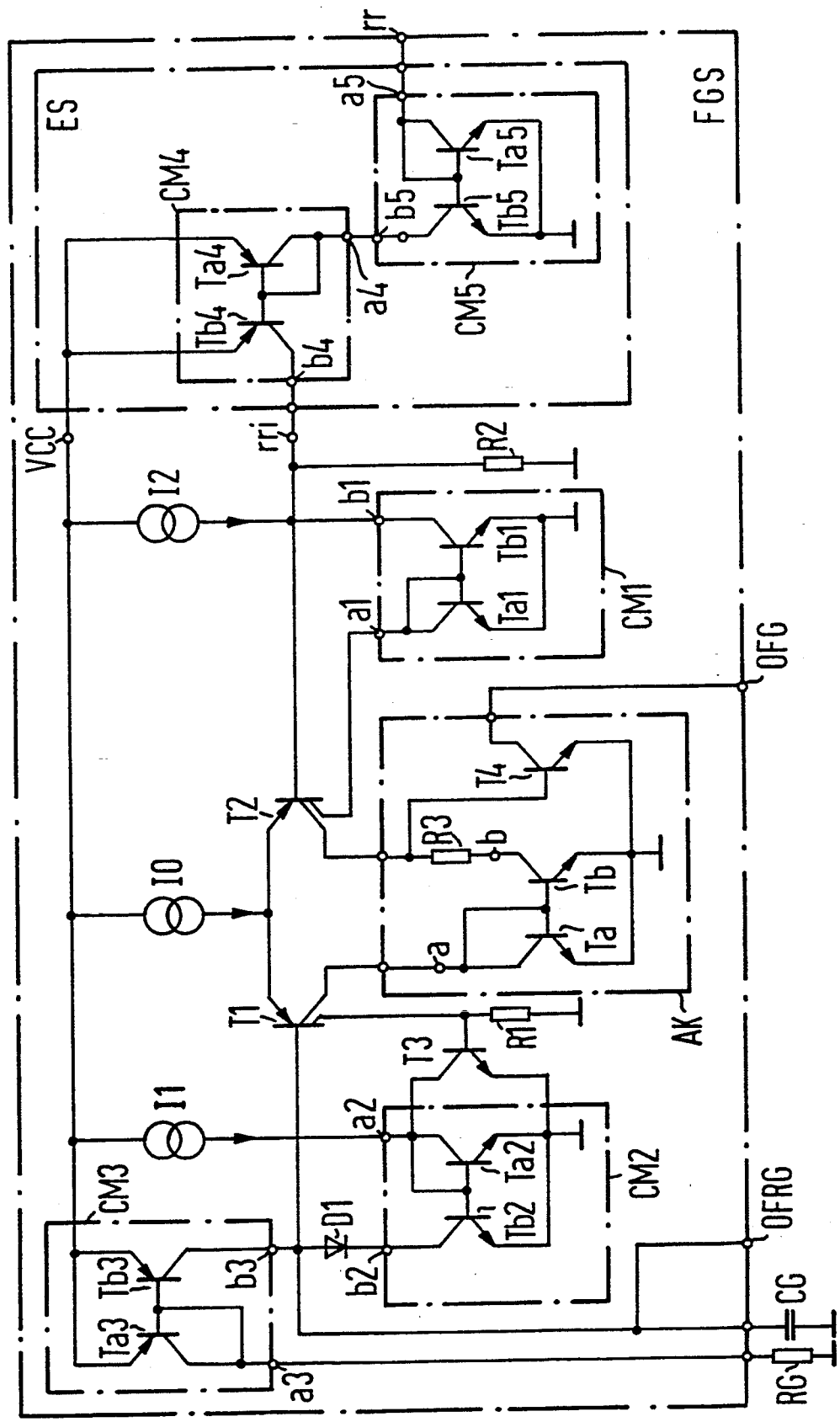
FIG. 3 is a schematic circuit diagram of an especially advantageous embodiment of a frequency generator circuit of FIG. 2 that furnishes both a clock frequency and a ramp voltage.

The frequency generator FGS of FIG. 3 has a control current input terminal rr, which is connected to a control current input a5 of an input current mirror circuit CM5. An exemplary embodiment of such a current mirror circuit is a basic current mirror circuit including two bipolar transistors Ta5 and Tb5, having a common base terminal which is connected to a collector terminal of the transistor Ta5 and forms the control current input a5, and having emitter terminals which together are connected to a reference potential. A collector terminal of the transistor Tb5 is connected to a current output b5. In the exemplary embodiment shown, this current mirror circuit CM5 serves as a current sink. The current output b5 of the current mirror circuit CM5 is connected to a control circuit input a4 of a further current mirror circuit CM4. This current mirror circuit CM4 is constructed as a current source, which in the exemplary embodiment is formed analogously to the current mirror circuit CM5 by two pnp transistors Tb4 and Ta4. A collector terminal of the transistor Tb4 in this case is connected to a current output b4 of the current mirror circuit CM4. Emitter terminals of the two transistors Ta4 and Tb4 are connected to a supply potential VCC. The current output b4 of the current source CM4 forms an output of an input stage ES and is connected to an internal control current input rri. The input stage ES for the control current serves to decouple the control current input rr from the following circuit. The control current input rri is connected to a current node which in turn is connected to a current source I2 that is connected to the supply potential VCC. The current node is connected to a control output b1 of a current mirror circuit CM1 that is constructed as a current sink, to a base terminal of a transistor T2, and to one terminal of a resistor R2 having another terminal which is acted upon by the potential, ground, that is opposite the supply potential VCC. In the exemplary embodiment shown, the current mirror circuit CM1 is laid out analogously to the current mirror circuit CM5, with an output transistor Tb1 having a collector terminal which forms the current output b1, and an input transistor Ta1 having a collector terminal which forms a control current input a1 together with base terminals of the transistor Ta1 and the transistor Tb1. In the exemplary embodiment shown, the transistor T2 is constructed as a multicollector transistor. A first collector of the transistor T2 is connected to the control current input a1 of the current source CM1. The transistor T2 in the exemplary embodiment is constructed as a pnp transistor, having an emitter terminal which is connected to an emitter terminal of a further pnp transistor T1. The emitter terminals of the transistors T1 and T2 are connected together to a current output of a current source I0, which is connected to the supply potential VCC. A base terminal of the transistor T1, which is likewise constructed as a multicollector transistor, is connected to reference potential, ground, through a capacitor CG. The base terminal of the transistor T1 is also connected to a current output b3 of a current mirror circuit CM3 that is constructed as a current source, and to a current output b2 of a current mirror circuit CM2 that is constructed as a current sink. The base terminal of the transistor T1 is connected to the current output b2 of the current sink CM2 through a diode D1 that is polarized in the forward direction. The advantage of this is that at the turn-on instant, the base voltage at the transistor T1 is raised immediately to approximately 0.7 V. The base terminal of the transistor T1 also forms the output of the ramp generator and is connected to the output terminal OFRG. The current mirror CM3 that is connected as a current source is formed analogously to the current mirror CM4 and has two pnp transistors Ta3 and Tb3. A collector terminal of the transistor Tb3 represents the current output b3 of the circuit CM3, while a collector terminal of the transistor Ta3 is connected to a control current input a3. The control current input a3 of the current mirror CM3 is connected to reference potential, ground, through a resistor RG. The resistor RG, substantially in common with the capacitor CG, defines the frequency of the frequency generator. A control current input a2 of the current mirror circuit CM2, which is made of two npn transistors Ta2 and Tb2 analogously to the current mirror circuit CM5, is connected to the supply potential VCC through a current source I1. A collector terminal of an npn transistor T3 is connected to the control current input a2 of the current mirror circuit CM2, and the emitter terminal of this transistor T3 is connected to reference potential, ground, and thus is connected to emitter terminals of the transistors Ta2 and Tb2. A base terminal of this transistor T3 is connected to a first collector terminal of the transistor T1 and is connected to reference potential, ground, through a resistor R1. The two transistors T1 and T2 are operated as an oscillator circuit. The transistor T2 switches over the switching thresholds, and the transistor T1 switches over between charging and discharging of the capacitor CG. Due to this structure, arbitrarily small frequencies are switchable. As a result of the resistor R1 in a collector circuit of the transistor T1, there is asymmetry in the overall configuration, which prevents a short transit time from slowing down the oscillator switchover. The current mirror circuit CM1 in a collector circuit of the transistor T2 leads to co-coupling, so that the circuit can switch over abruptly. The push-pull transistors T1 and T2 must admittedly be controlled out of saturation, which results in a time loss. However, because of the slight voltage rise that is necessary for switchover of a decoupling stage, and because no capacitors need to be recharged inside the push-pull stage, the overall configuration, including the oscillator stage and a decoupling stage AK is fast. A second collector terminal of the transistor T1 is connected to a terminal a of the decoupling stage AK. A second collector terminal of the transistor T2 is connected to a terminal b of the decoupling stage AK and is also connected to a base terminal of a transistor T4 contained in this decoupling stage AK. In this case, a base terminal of the transistor T4 is connected to the terminal b through a resistor R3. The terminal b is provided as a current output terminal of a current mirror circuit. This current mirror circuit is constructed as a current sink and is formed in a known manner of two transistors Ta and Tb. A collector terminal of the transistor Tb is connected to the terminal b, and the base terminals of the transistors Ta and Tb are connected, together with the collector terminal of the transistor Ta, to the current input terminal a of this current mirror circuit and therefore of the decoupling stage AK. Emitter terminals of the two transistors Ta and Tb are connected to reference potential, ground. An emitter terminal of the transistor T4, which is provided as a decoupling transistor, is likewise connected to reference potential, ground. A collector terminal of the transistor T4, as a so-called open collector, is connected to a signal output terminal OFG of the frequency generator circuit FGS. As a result of the resistor R3 between the base terminal of the decoupling transistor T4 and the current output b of the current sink having the transistors Ta and Tb, the switchover time of this decoupling stage is shortened. The transistors Ta and Tb are operated at saturation. The resistor R3 reduces the rise of the decoupling stage, because it keeps the voltage at the base of the coupling transistor T4 at approximately 0.4 V.

The configuration of FIG. 3 furnishes an oscillator signal at the output terminal OFG and a ramp signal of the same frequency at the output terminal OFRG, because of the integrating action of the capacitor CG.

The mode of operation of the oscillator furnished by the transistors T1 and T2 in combination with the current source I0 will be described below. As a result of the charging of the capacitor CG, a low, rising voltage is present at the base terminal of the transistor T1 and leads to a flow of current in the transistor T1. The transistor T2 accordingly carries no collector current. Since the transistor T2 is not carrying collector current, the current mirror circuit CM1 likewise carries no current at its current output b1, so that the current fed from the input stage ES and the current furnished by the current source I2 flow out through the resistor R2, and therefore a high voltage is present at the base terminal of the transistor T2. If the base voltage at the transistor T1 equals the magnitude of the base voltage at the transistor T2, the result is a low collector current in the transistor T2, and the current mirror circuit CM1, which is connected as a current sink, carries a current away from the base terminal of the transistor T2 through the current output b1. Due to the co-coupling, this current rises very fast, so that the transistor T1 no longer carries any collector current. The base voltage at the transistor T2 is pulled down to below a lower threshold. If the transistor T1 carries no collector current, then no voltage drops across the resistor R1. As a result, the current mirror circuit CM2, which is connected as a current sink, discharges the capacitor CG, through the current output b2 and the diode D1. That is, the current mirror circuit CM2 serves to discharge the capacitor CG, and the current mirror circuit CM3 serves to charge the capacitor CG. The ratio of the leading edge to the trailing edge of a signal applied to the capacitor CG and therefore to the output terminal OFRG can be adjusted by means of the current ratio between the current sink CM2 and the current source CM3.

Figure 4A:
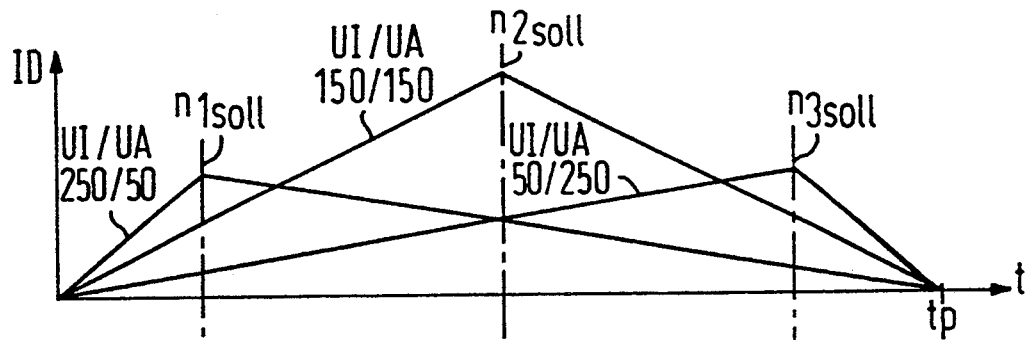
FIG. 4a is a diagram illustrating a current course during a period through a choke of a high set actuator, for the case of a sinusoidal input voltage with an amplitude value of 300 V and an output direct voltage of 300 V, with an instantaneous value of an input voltage UI as a parameter, for the case where UI=250 V, UI=150 V, and UI=50 V.
Figure 4B:
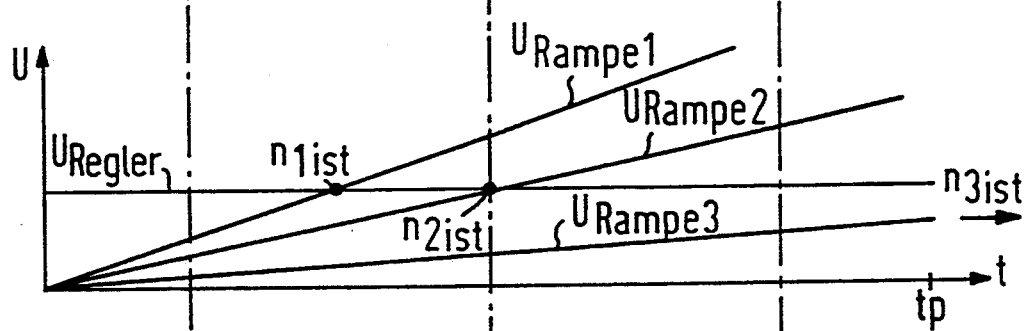

The limits of a method for anticipatory control of a switched-mode power supply with the aid of a variable ramp slope are shown in an example in FIG. 4, and particularly in FIG. 4b in combination with FIG. 4a.

FIG. 4a is a schematic illustration which shows a current through the choke of a high set actuator for the case of an example where the output direct voltage UA is 300 V, and a sinusoidal inputs voltage UI with a peak Value UI of 300 V is provided as the peak voltage. The instantaneous value of the input voltage UI is provided as a parameter, and FIG. 4a, for a certain constant load, shows a command duty factor referred to the particular input voltage. A duty factor $n_{1soll}$ is associated with an instantaneous value of the input voltage where UI=250 V, a duty factor $n_{2soll}$ results at an instantaneous value of the input voltage UI of 150 V, and a duty factor $n_{3soll}$ results for an input voltage UI of 50 V.

FIG. 4b shows the course of voltage at two signal inputs of a comparator that is responsible for the anticipatory control in the case where anticipatory control is performed by means of a variable ramp slope. A horizontal straight line designated as $U_{Regler}$ represents the output voltage of a controller or regulator referred to a certain constant load. A ramp voltage $U_{Rampe1}$ corresponds to the anticipatory controlled output voltage of a ramp generator for an instantaneous value of the input voltage UI of 250 V. The intersection of this ramp with the voltage $U_{Regler}$ indicates an actual duty factor $n_{1ist}$. A ramp voltage $U_{Rampe2}$ is established at an input voltage UI of 150 V. The intersection of that ramp with the regulator output voltage defines the duty factor $n_{2ist}$. The ramp voltage $U_{Rampe3}$ corresponds to an input voltage of UI=50 V. As can be seen, this ramp, within the period shown, does not intersect the controller or regulator output voltage $U_{Regler}$. In the example shown, anticipatory control is accordingly not possible if the instantaneous value of the input voltage is UI=50 V. The duty factor $n_{list}$ associated in this example with an input voltage of UI=250 V likewise does not match the corresponding command duty factor $n_{1soll}$. As can be learned from FIG. 4b, the anticipatory control by means of controlled ramp slope, functions properly only with input voltages that are in the vicinity of the rated value for which the anticipatory control was dimensioned.

Figure 4C:
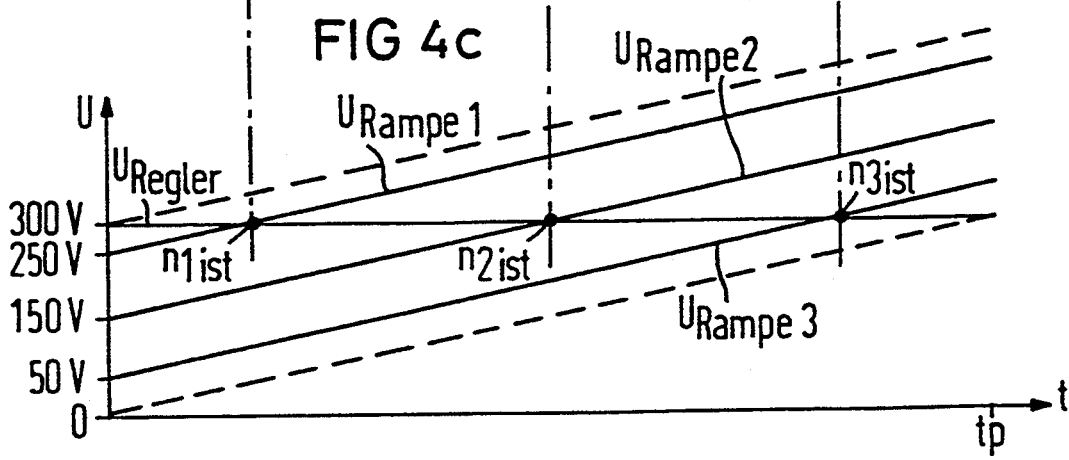
FIG. 4c is a diagram illustrating voltage courses as in FIG. 4b, but for the case of an anticipatory control according to the invention by varying the direct voltage component of the ramp voltage.

FIG. 4c shows the course of voltage at two signal inputs of a comparator, which is responsible for the anticipatory control in the case of an anticipatory control according to the invention. FIG. 4c accordingly shows a similar situation to that of FIG. 4b, with the difference that the ramp voltage $U_{Rampe1}$ does not differ in its slope from the ramp voltage $U_{Rampe2}$ and from the ramp voltage $U_{Rampe3}$, but instead differs by the height of a direct voltage superimposed on the ramp. The ramps $U_{Rampe1}$, $U_{Rampe2}$ and $U_{Rampe3}$ thus extend parallel to one another. In the example shown in FIG. 4, the intersection of the applicable ramp voltage with the reference voltage $U_{Regler}$ at the comparator is located in such a way that the actual duty factors $n_{1ist}$, $n_{2ist}$ and $n_{3ist}$ each correspond to the command duty factors $n_{1soll}$, $n_{2soll}$ and $n_{3soll}$ for an optimal anticipatory control, as they are shown in FIG. 4a. With a method according to the invention for anticipatory control of a switched-mode power supply in order to compensate for fluctuations in the feed voltage, an anticipatory control of the switched-mode power supply that is independent of the input voltage is accordingly possible in the ideal case, so that the voltage regulator then only needs to compensate for the load-dictated fluctuations in the output voltage UA of a corresponding switched-mode power supply.

The employment of such anticipatory control is naturally not limited to the way in which the exemplary embodiment is constructed. The same method can also be employed with blocking oscillator switched-mode power supplies, high/low set actuators, and low set actuators.

What is claimed is:

1. In a method for anticipatory control of a switched-mode power supply for compensating for fluctuations in a feed voltage, wherein the switched-mode power supply includes:

at least one electronic switch; and
   a control circuit with a frequency generator, a comparator circuit, and a trigger circuit;
   the trigger circuit furnishing a trigger signal for the at least one electronic switch as a function of an output signal of the comparator circuit and an output signal of the frequency generator;
   the comparator circuit having a switching threshold being defined as a function of a load current of the switched-mode power supply;
   the comparator circuit having a signal input being triggered with a periodically rising and falling control signal having a frequency defined by the frequency generator; and
   the control signal having a signal shape being varied as a function of an instantaneous value of a feed voltage of the switched-mode power supply, the improvement which comprises:
   defining a relatively higher frequency of the control signal with the signal generator, as compared with a frequency of the feed voltage; and
   varying only a direct voltage component of the periodically rising and falling control signal having a direct voltage component and an alternating voltage component, as a function of fluctuations of the feed voltage of the switched-mode power supply.

2. The method according to claim 1, which comprises imparting a sawtooth shape on the alternating voltage component of the periodically rising and falling control signal.

3. In a switched-mode power supply having at least one electronic switch, a control circuit for compensating for fluctuations in a feed voltage, comprising:

a frequency generator supplying an output signal, a comparator circuit supplying an output signal, a trigger circuit connected to said frequency generator, to said comparator circuit and to the at least one electronic switch, and a circuit element furnishing a periodically rising and falling control signal with a frequency defined by said frequency generator;
   said trigger circuit furnishing a trigger signal for the at least one electronic switch as a function of the output signal of said comparator circuit and the output signal of said frequency generator;
   said comparator circuit having a switch threshold being defined as a function of a load current of the switched-mode power supply;
   said comparator circuit having a signal input being triggered with the periodic control signal; and
   the control signal having a signal shape being varied as a function of an instantaneous value of the feed voltage of the switched-mode power supply, the control signal including a direct voltage component and an alternating voltage component, and said circuit element furnishing the control signal having a circuit configuration for varying the direct voltage component of the control signal as a function of fluctuations in the feed voltage of the switched-mode power supply.

4. The control circuit according to claim 3, wherein said frequency generator furnishes both a rectangular signal and a ramp-shaped signal having the same period duration.

* * * * *